Patented Aug. 5, 1941

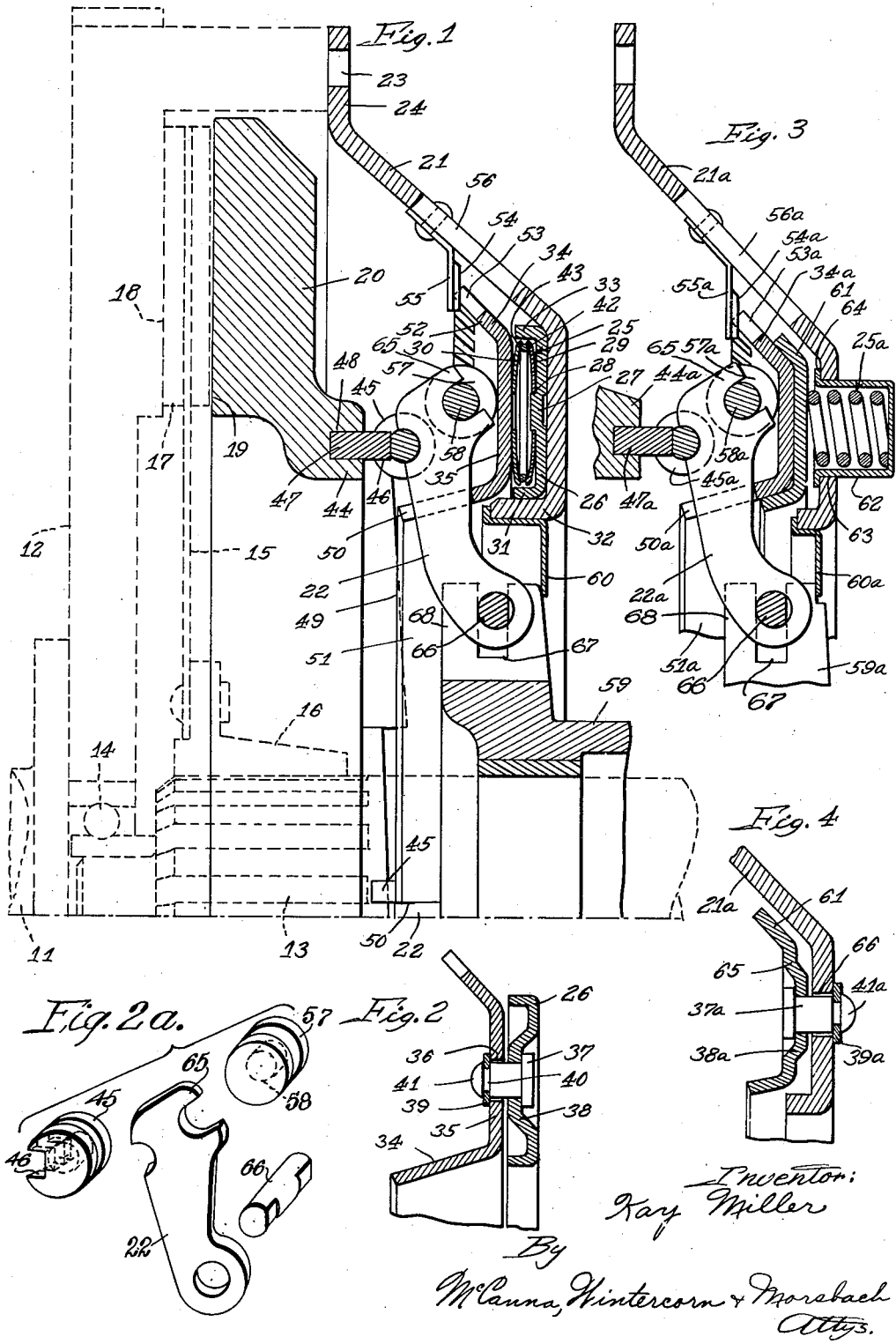

2,251,367

UNITED STATES PATENT OFFICE 2,251,367

CLUTCH

Kay Miller, Rockford, Ill., assignor to The Atwood Vacuum Machine Company, Rockford, Ill., a copartnership composed of Seth B. Atwood and James T. Atwood Application September 18, 1939, Serial No. 295,349

22 Claims. (Cl. 192—68)

This invention relates to friction clutches and more particularly over-center type clutches especially designed for tractors but suitable, of course, for other heavy duty purposes, the present clutch being more specifically concerned with improvements in the type of clutch disclosed in the copending application of W. Vincent Thelander and myself, Serial No. 194,337, filed March 7, 1938.

The clutch disclosed in the earlier application embodies spring means between the pressure plate and over-center engaging means for the purpose of compensating in the spring means for wear on the clutch disk facings. The present clutch, however, embodies its spring means between the over-center engaging means and the back plate, this construction affording certain advantages both in the assembling of the clutch and in its operating characteristics, as will later appear.

The invention is illustrated in the accompanying drawing, in which—

Figure 1 is a longitudinal section through a clutch made in accordance with my invention showing only so much as appears on one side of the longitudinal center line, whereby to permit showing the parts on a larger scale;

Fig. 2 is a sectional detail showing the method of assembling the two parts between which the spring means is caged in pre-loaded condition;

Fig. 2a is a perspective view of a disassembled group of parts which when assembled form one of the over-center clutch engaging levers employed;

Fig. 3 is a longitudinal section along the lines of Figure 1 showing modified or alternative construction, and Fig. 4 is a sectional detail similar to Fig. 2 showing the method of assembling employed for a similar purpose in this design.

Similar reference numerals are applied to corresponding parts throughout the views.

Referring first to Figs. 1 and 2, the end portion of the crank shaft of the engine is indicated in dotted lines at 11 and the flywheel at 12. 13 is the driven shaft extending rearwardly from the flywheel and clutch into the gear box of the transmission, in the usual way. It has the usual pilot bearing 14 supporting the front end thereof at the center of the flywheel 12. 15 is the clutch disk, the center hub 16 of which is splined on the front end of the shaft 13 to transmit drive from the flywheel to the shaft when the clutch is engaged. The usual pads or facings 17 on the clutch disk are adapted for engagement with the driving face 18 on the back of the flywheel and the companion driving face 19 on the front of the pressure plate 20. The latter is suitably cast like the flywheel, and the faces 18 and 19 are accurately machined on these cast parts to insure smooth clutch engagement. The back plate 21, in accordance with my invention, is stamped from sheet metal to the dished form shown, so as to provide enough space between it and the pressure plate 20 for the bell-crank levers 22 which constitute the over-center engaging means of the clutch. The back plate is suitably secured to the rim of the flywheel by bolts entered through holes 23 in the flanged marginal portion 24 of the back plate. A plurality of equally circumferentially spaced lugs (not shown) cast integral with the pressure plate 20, project rearwardly therefrom, and these lugs have the side faces thereof machined smooth to slide freely on the sides of holes provided in the back plate, as shown in the earlier application. In that way, the pressure plate turns with the flywheel, but is movable toward and away from the driving face 18 for engagement and disengagement of the clutch. Suitable spring means are also provided as disclosed in the earlier application tending normally to retract the pressure plate 20 toward the back plate 21 to insure immediate disengagement of the clutch when the levers 22 are moved to the position shown in Figure 1 for disengagement of the clutch.

A plurality of stacked Belleville spring washer assemblies, indicated generally by the numeral 25, are held compressed between the back plate 21 and the levers 22 so as to provide a pre-loaded spring means for resiliently engaging the clutch, the term "pre-loaded" signifying that upon engagement of the clutch, said spring means are arranged to be subjected to further compressure, and it is this increased spring pressure that is effective on the pressure plate 20 holding the clutch disk 15 engaged between the flywheel and pressure plate. The stacked spring washer assemblies 25, of which any suitable number are provided—eight are commonly used, are arranged all on the same radius and in equally circumferentially spaced relation. 26 is a sheet metal ring which has struck-up cylindrical bosses 27 of a size to fit in the center holes 28 in one of the disks 29 and 30 of each of the assemblies 25 so as to locate the assemblies in the desired equally circumferentially spaced relation. The ring 26 has an inner circumferential flange 31 fitting around the inturned flange 32 on the back plate 21, whereby to hold the ring 26 in true concentric relation with the back plate, pressure plate and flywheel. 33 is an outer circumferential flange which is mainly for reinforcement of the ring 26, although it cooperates with the flange 31 to enclose or house the assemblies 25. 34 designates a sheet metal ring of channel-shaped cross-section whose web portion 35 has a series of holes 36 provided therein in equally circumferentially spaced relation at points preferably midway between the assemblies 25 to receive the shanks of rivets 37 that serve to fasten the rings 26 and 34 together, keeping the spring washer assemblies 25 in preloaded condition. The ring 26 has depressions 38 provided therein to receive the headed ends of the rivets 37 so that short shank rivets can be used to secure the rings together, washers 39 being provided on the reduced ends 40 of the rivets prior to the upsetting of the ends thereof as at 41, to maintain the parts in permanently assembled relation. The pre-loaded spring pressure of the individual assemblies 25 will vary, of course, for different clutches, but as an example, I might state that the initial or pre-loaded spring pressure used in one clutch of the present design was about 160# per assembly, and in the engagement of the clutch, the spring washers 29 and 30 were arranged to be compressed further to an engagement pressure of about 245#. The amount of travel required in that clutch to change the compression from the pre-loaded pressure of 160# to the engagement pressure of 245# was .060", and it follows, therefore, that a few thousandths of an inch wear on the clutch disk facings 17 under those conditions would not be noticeable and could not seriously affect the operation of the clutch, whereas in the ordinary unimproved over-center clutch, a small amount of wear on the clutch disk facings resulted in excessive slippage and thereby accelerated the wear upon the facings and made necessary frequent accurate adjustments which only a specially skilled mechanic could make. In other words the spring means employed has a low rate characteristic within the operating range. Due to the amount of leeway afforded with the present spring compensated construction, substantially constant engaging pressure is obtained regardless of a normal amount of wear, and the clutch operates satisfactorily with fairly coarse adjustments. In passing, it will be seen that each assembly 25 has in combination with the two Belleville type spring washers 29 and 30, a spacer ring 42 held in centered relationship with the washers within the curled or flanged peripheries 43 thereof. The washers 29 and 30 are interchangeable, both having center holes 28, as indicated.

The levers 22 operate between the web portion 35 of the ring 34 and the inner rim portion 44 of the pressure plate 20, the levers being pivoted on fulcrum blocks 45 that are slotted lengthwise on one side as at 46 to straddle the projecting portion of arcuate cams 47 that are mounted in an annular groove 48 in the rim 44. The cams 47, of which there are four, one for each of four equally circumferentially spaced levers 22, are formed from strips stamped from sheet metal and subsequently formed to the desired arcuate form, as disclosed in the earlier application. The inclined surfaces 49 provided on each of the cams 47 provide the desired helical cam surface for the related fulcrum block 45, and when these fulcrum blocks are slid along the cams 47 by rotary adjustment of the levers 22 with the ring 34 in the manner described in the earlier application, there is a change in the relationship between the levers 22 and the spring means 25 and pressure plate 20 to compensate for wear on the clutch disk facings 17. The levers 22 work in slots 50 in the inner circumferential flange 51 of the ring 34 so as to turn with the ring 34 in the rotary adjustment thereof and slide the fulcrum blocks 45 along the cams 47. The outer circumferential flange 52 of the ring 34 has the edge portion thereof formed to provide teeth 53 between which a radial rib 54 on a leaf spring 55 secured to the back plate 21 is arranged to engage to hold the ring 34 in adjusted position. One or more holes 56 in the back plate 21 adjacent the teeth 53 enable easy manual rotary adjustment of the ring 34. Obviously, as the ring 34 turns, the ring 26 is turned with it relative to the back plate 21. Easy operation of the clutch is assured by rollers 57 which are annularly grooved as shown to receive the forked portion 65 of the levers 22 and at the same time provide axles 58 to bear in said forks. These rollers operate on the flat inner face of the web portion 35 of the ring 34, and of course, move radially inwardly as the levers 22 are moved in a clockwise direction about their fulcrum blocks 45 by movement of the throwout collar 59 operated by the usual yoke or other clutch operating means. The rollers 57 are moved slightly past dead center relationship to the fulcrum blocks 45 in the engagement of the clutch, the clutch deriving its name "over-center type" from this kind of operation. In the disengagement of the clutch the pressure plate 20 is retracted by spring action toward the back plate 21, and the movement is limited by the engagement of the throwout collar 59 with a stamped sheet metal ring 60 that fits on the flange 32 of the back plate. Each of the levers 22 is connected with the throwout collar 59 by means of a pin 66 which has a cylindrical middle portion to fit a bearing hole in the end of the lever, but has flats provided on the end portions to fit slidably and non-rotatably in the slots 67 in the forked portion 68 on the throwout collar 59. The shape and mode of mounting the fulcrum blocks 45 and rollers 57 is thought to be clear from the showing in Fig. 2a.

The clutch shown in Figs. 3 and 4 is similar in construction but has coiled springs 25a replacing the stacked spring washer assemblies 25, the springs 25a being located in circumferentially spaced relation between the back plate 21a and a ring 61, and housed in stamped sheet metal cups 62 which fit in holes 63 provided in the back plate, and are held against displacement from the holes by annular outwardly projecting flanges 64. The springs 25a, of which there may be eight to correspond to the eight spring washer assemblies 25, and similarly spaced circumferentially with respect to the back plate 21a, are pre-loaded and held under compression by the ring 61, the latter being secured to the back plate 21a by rivets 37a. These rivets fit in depressed portions 38a in the web portion 65 of the ring 61 and are entered through holes 66 in the back plate and receive washers 39a on the reduced ends thereof, which when upset as indicated at 41a, keep the parts in permanently assembled relation. The ring 61 is channel-shaped in cross-section and conformed to fit slidably on the ring 34a, which has the adjustment ring for the clutch similarly as the clutch 34 shown in Figure 1, this clutch being otherwise similar in construction to that first described, as indicated by the corresponding numbering of the remaining parts shown.

It is believed the foregoing description conveys a good understanding of the objects and advantages of my invention. The appended claims have been drawn to cover all legitimate modifications and adaptations.

I claim:

1. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, positive-acting over-center means for moving the pressure plate away from the back plate to engage the clutch, Belleville spring washer means compressible between the back plate and over-center means for resiliently transmitting pressure from the latter to the pressure plate, said Belleville spring washer means having an inherent low rate within its operating range, and means having lost-motion connection with the back plate holding the Belleville spring washer means in pre-loaded condition compressed to a point within the low rate range but permitting further loading by said over-center mean when the latter is operated to engage the clutch and moves said holding means within its lost-motion connection.

2. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, positive-acting over-center means for moving the pressure plate away from the back plate to engage the clutch, spring means supported in circumferentially spaced relation relative to the back plate for resiliently transmitting pressure through the over-center means to the pressure plate, a single ring for transmitting pressure from the over-center means to the spring means to engage the clutch resiliently, and another ring having lost motion connection with the first ring for holding the spring means in pre-loaded condition but permitting further loading by said over-center means when the latter is operated to engage the clutch and moves said holding means within its lost-motion connection.

3. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of springs carried on the back plate in circumferentially spaced relation, positive-acting over-center means for moving the pressure plate away from the back plate to engage the clutch, and a single intermediate member for transmitting pressure from the over-center means to the springs whereby to engage the clutch resiliently.

4. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of springs carried on the back plate in circumferentially spaced relation, positive-acting over-center means for moving the pressure plate away from the back plate to engage the clutch, a single intermediate member for transmitting pressure from the over-center means to the springs whereby to engage the clutch resiliently, and means for guiding said intermediate member for movement with respect to the back plate toward and away from the same, said means keeping the springs compressed to a predetermined initial loading prior to the compression thereof upon operation of said over-center means.

5. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of coiled compression springs carried on the back plate in circumferentially spaced relation, positive-acting over-center means for moving the pressure plate away from the back plate to engage the clutch, a single intermediate member for transmitting pressure from the over-center means to the springs whereby to engage the clutch resiliently, spring retainer cups mounted in holes provided in the back plate and housing said springs, and supports on the intermediate member slidable in holes in the back plate to guide the intermediate member relative to the back plate, said supports being further constructed to limit movement of said intermediate member away from the back plate so as to keep the springs pre-loaded.

6. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of springs carried on the back plate in circumferentially spaced relation, a ring member holding all of said springs in pre-loaded condition and caged in relation to the back plate, positive-acting over-center means acting between the ring member and pressure plate to force the pressure plate away from the back plate so as to engage the clutch resiliently, and circumferentially extending cam means on the pressure plate providing a variable height abutment for the over-center means, said cam means and over-center means being relatively rotatably adjustable whereby to take up for wear in the engaging clutch faces.

7. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of springs disposed in circumferentially spaced relation to the back plate, a pair of spaced ring members holding said springs therebetween in pre-loaded condition, said rings being movable relative to one another to permit further loading of said springs, positive-acting over-center means disposed between one of said rings and the pressure plate and arranged to move the pressure plate away from the back plate and further load said springs whereby to engage the clutch resiliently, and circumferentially extending cam means on the pressure plate providing a variable height abutment for the over-center means, said over-center means being rotatably adjustable relative to the cam means, whereby to take up for wear in the engaging clutch faces.

8. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of springs disposed in circumferentially spaced relation to the back plate, a pair of spaced ring members holding said springs therebetween in pre-loaded condition, said rings being movable relative to one another to permit further loading of said springs, positive-acting over-center means disposed between one of said rings and the pressure plate and arranged to move the pressure plate away from the back plate and further load said springs whereby to engage the clutch resiliently, and circumferentially extending cam means on the pressure plate providing a variable height abutment for the over-center means, the aforesaid pair of rings being rotatably adjustable relative to the back plate and carrying the over-center means therewith so as to adjust the same relative to the cam means to take up for wear in the engaging clutch faces.

9. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of Belleville spring washers disposed in circumferentially spaced relation relative to the back plate, a pair of spaced ring members holding the washers caged therebetween preventing more than a like predetermined axial expansion of all of the washers, and over-center means acting between one of said rings and the pressure plate to force the pressure plate away from the back plate and engage the clutch resiliently under the combined pressure of said spring washers.

10. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of Belleville spring washers disposed in circumferentially spaced relation relative to the back plate, a pair of spaced ring members holding the washers caged therebetween preventing more than a like predetermined axial expansion of all of the washers, over-center means acting between one of said rings and the pressure plate to force the pressure plate away from the back plate and engage the clutch resiliently under the combined pressure of said spring washers, and circumferentially extending cam means on the pressure plate providing a variable height abutment for the over-center means, said cam means and over-center means being relatively rotatably adjustable whereby to take up for wear in the engaging clutch faces.

11. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of Belleville spring washer assemblies disposed in circumferentially spaced relation relative to the back plate, each assembly comprising at least two opposed washers with a spacer therebetween allowing free travel of the movable edges of said washers, a pair of spaced ring members holding the assemblies in preloaded condition caged therebetween preventing more than a like predetermined axial expansion of all of said washers, and over-center means acting between one of said rings and the pressure plate to move the latter away from the back plate and engage the clutch resiliently under the combined pressure of said spring washer assemblies.

12. In a friction clutch, the combination with a flywheel constituting the driving element, and a clutch disc containing the driven element, of a back plate for the flywheel, a pressure plate turning with the back plate and movable toward and away from the same in the disengagement and engagement of the clutch, respectively, a ring mounted for rotary adjustment relative to the back plate, bell-crank levers rotatably adjustable with the ring relative to the back plate and mounted for pivotal movement between the back plate and pressure plate to force the latter away from the back plate to engage the clutch, helical cam means on said pressure plate extending circumferentially with respect thereto and providing variable height surfaces thereon for abutment by said levers, and resilient means carried on the back plate and compressible by said ring to cause resilient engagement of the clutch.

13. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a ring mounted for rotary adjustment relative to the back plate, bell-crank levers mounted on said ring for pivotal movement between the back plate and pressure plate to force the latter away from the back plate to engage the clutch, helical cam means on said pressure plate extending circumferentially with respect thereto and providing variable height surfaces thereon for abutment by said levers, another ring having abutment with the back plate and mounted for rotary adjustment relative to the back plate with the first ring, and resilient means compressible between said rings so as to cause resilient engagement of the clutch.

14. A clutch as set forth in claim 13, including means cooperating with the two rings to hold the resilient means under a predetermined preload, said means being so arranged with respect to the two rings as to permit further loading of said resilient means in the operation of the bellcrank levers to engage the clutch.

15. A friction clutch as set forth in claim 4, wherein the springs are of a type having an inherent low rate within the operating range.

16. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of Belleville spring washers carried on the back plate in circumferentially spaced relation, positive acting over-center means for moving the pressure plate away from the back plate to engage the clutch, and a single intermediate member for transmitting pressure from the over-center means to said Belleville spring washers, whereby to engage the clutch resiliently.

17. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of Belleville spring washers carried on the back plate in circumferentially spaced relation, positive acting over-center means for moving the pressure plate away from the back plate to engage the clutch, a single plate engaging said Belleville spring washers to transmit pressure from the over-center means to said Belleville spring washers to engage the clutch resiliently, said single plate being in substantially parallel spaced relation to the pressure plate, and circumferentially extending cam means on one of the two last mentioned plates providing a variable height abutment for the over-center means, said cam means and over-center means being relatively rotatably adjustable whereby to take up for wear in the engaging clutch faces.

18. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of Belleville spring washer assemblies disposed in circumferentially spaced relation relative to the back plate, each assembly comprising at least two opposed washers with a spacer therebetween allowing free travel of the movable edges of said washers, a plate holding the assemblies engaged between it and the back plate, preventing more than a like predetermined axial expansion of all the individual washers, over-center means for transmitting movement through said washer engaging plate to the washers in moving the pressure plate away from the back plate whereby to engage the clutch resiliently, the washer engaging plate being in substantially parallel spaced relation to the pressure plate, and circumferentially extending cam means on one of the two last mentioned plates providing a variable height abutment for the over-center means, said cam means and over-center means being relatively rotatably adjustable whereby to take up for wear in the engaging clutch faces.

19. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a ring mounted for rotary adjustment relative to the back plate, bell-crank levers rotatably adjustable with the ring relative to the back plate and mounted for pivotal movement between the back plate and pressure plate to force the latter away from the back plate to engage the clutch, helical cam means on said pressure plate extending circumferentially with respect thereto and providing variable height surfaces thereon for abutment by said levers, another ring relative to which the first ring is rotatable, and resilient means compressed between the back plate and the second ring and arranged to be subjected to further compression by the first ring in the engagement of the clutch.

20. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a ring mounted for rotary adjustment relative to the back plate, bell-crank levers rotatably adjustable with the ring relative to the back plate and mounted for pivotal movement between the back plate and pressure plate to force the latter away from the back plate to engage the clutch, helical cam means on said pressure plate extending circumferentially with respect thereto and providing variable height surfaces thereon for abutment by said levers, another ring non-rotatable with respect to the back plate rotatably supporting the first ring, and resilient means compressible between the back plate and the second ring so as to cause resilient engagement of the clutch.

21. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of springs carried on the back plate in circumferentially spaced relation, positive-acting over-center means for moving the pressure plate away from the back plate to engage the clutch, cam means extending circumferentially with respect to the pressure plate for abutment by said over-center means, and a ring member for rotatably adjusting said over-center means relative to the cam means and transmitting pressure from the over-center means to the springs, whereby to engage the clutch resiliently.

22. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, resilient means carried on the back plate in preloaded condition, positive-acting over-center means for moving the pressure plate away from the back plate to engage the clutch, cam means extending circumferentially with respect to the pressure plate, and a ring member for rotatably adjusting said over-center means relative to the cam means and transmitting pressure from the over-center means to said resilient means to load the latter further so as to engage the clutch resiliently under increased pressure.

KAY MILLER.

CERTIFICATE OF CORRECTION.

Patent No. 2,251,367. August 5, 1941.

KAY MILLER.

It is hereby certified that error appears in the printed specification of the above numbered patent requiring correction as follows: Page 4, second column, line 19, claim 12, for the word "containing" read --constituting--; lines 44 and 45, claim 13, for "levers mounted on said ring" read --levers rotatably adjustable with the ring relative to the back plate and mounted--; and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.